(12) United States Patent
Matsumoto (10) Patent No.: US 8,391,681 B2
(45) Date of Patent: Mar. 5, 2013

(54) INFORMATION REPRODUCING APPARATUS, AND BUFFER CONTROL METHOD AND PROGRAM

(75) Inventor: Hideyuki Matsumoto, Kanagawa (JP)

(73) Assignee: Sony Corporation (JP)

( * ) Notice: Subject to any disclaimer, the term of this patent is extended or adjusted under 35 U.S.C. 154(b) by 1152 days.

(21) Appl. No.: 11/666,112

(22) PCT Filed: Oct. 24, 2005

(86) PCT No.: PCT/JP2005/019505
§ 371 (c)(1),
(2), (4) Date: Feb. 14, 2008

(87) PCT Pub. No.: WO2006/046513
PCT Pub. Date: May 4, 2006

(65) Prior Publication Data
US 2009/0016448 A1    Jan. 15, 2009

(30) Foreign Application Priority Data

Oct. 27, 2004    (JP) ................................ P2004-311895

(51) Int. Cl.
*H04N 5/91* (2006.01)
(52) U.S. Cl. ...................................................... 386/326
(58) Field of Classification Search ................... 386/46, 386/326
See application file for complete search history.

(56) References Cited

U.S. PATENT DOCUMENTS

| 5,765,136 A * | 6/1998 | Fukuchi ........................ 704/500 |
| 2002/0154640 A1 | 10/2002 | Wei |
| 2005/0117583 A1* | 6/2005 | Uchida et al. .............. 370/395.4 |
| 2006/0109789 A1* | 5/2006 | Skerritt ........................ 370/238 |

FOREIGN PATENT DOCUMENTS

| EP | 0797325 A2 | 9/1997 |
| EP | 1204267 A2 * | 8/2001 |
| EP | 1204276 A2 | 5/2002 |
| JP | 09-321727 A | 12/1997 |
| JP | 2000-332831 A | 11/2000 |
| JP | 2002-290917 A | 10/2002 |

OTHER PUBLICATIONS

European Search Report, EP 05795908, dated Oct. 23, 2009.

* cited by examiner

*Primary Examiner* — Jason Gee
(74) *Attorney, Agent, or Firm* — Lerner, David, Littenberg, Krumholz & Mentlik, LLP

(57) ABSTRACT

A picture start code detecting section 131 detects the input timing of the leading data of a picture from TS packets inputted to a buffer 11. A counter 132 outputs a timing signal at the time when the leading data of the picture has been inputted 30 times, thereby detecting the input timing of data of one second. A counter 133 counts the data amount of TS packets inputted to the buffer 11 during the period of time from the reception of a timing signal from the counter 132 to the next reception. The count value is read via a DFF 134 and inputted to a read control section 135. The read control section 135 sets the input value from the DFF 134 as the reading speed of TS packets from the buffer 11.

6 Claims, 7 Drawing Sheets

INFORMATION REPRODUCING APPARATUS, AND BUFFER CONTROL METHOD AND PROGRAM

TECHNICAL FIELD

The present invention relates to an information reproducing apparatus that decodes and reproduces an encoded stream containing encoded data of a content, time management information used for the reproduction of the encoded data, and a time reference value serving as the reference for the time management information, and a buffer control method and program used for performing reproduction. More specifically, the present invention relates to an information reproducing apparatus, and a buffer control method and program, which are capable of properly decoding and reproducing the encoded data even when a deviation occurs in the transmission timing of the time reference value.

BACKGROUND ART

In recent years, due to advances in image compression and encoding techniques such as the MPEG scheme, it is now common to convert an image signal into a digital form for handling. For example, in the field of television broadcasting, while digital broadcasting using BS (Broadcasting Satellite) has already been in use, recently, digital terrestrial broadcasting has also been launched. These types of digital broadcasting use the MPEG scheme as the compression and encoding scheme to provide, in addition to conventional SD (Standard Definition) images, HD (High Definition) images with higher resolution.

On the other hand, there has been a rapid proliferation of digital video recorders which record video signals as digital data onto an optical disk or an HDD (Hard Disk Drive). In recent years, in particular, much attention is being given to a Blu-ray Disc as a portable optical disk with higher capacity. Video recorders using such a Blu-ray Disc are already on the market. A Blur-ray disc is capable of recording HD images compressed and encoded in the MPEG scheme for about two hours.

In digital video decoders, after an MPEG stream in the TS format compressed and encoded in the MEG scheme is received through broadcasting, the MPEG stream is recorded onto a recording medium as it is without any alterations, thus making it possible to retain the image quality of the original image. The use of an HDD or Blur-ray disc, in particular, allows the recording of not only an SD image but also an HD image to be performed without causing a degradation in image quality. Further, recording the received data as it is also proves advantageous from the viewpoint of simplifying the configuration of the apparatus.

In the MPEG scheme, synchronous reproduction of video is realized by referring to reproduction time information described in the data stream, and the time of a clock outputted by a reproducing apparatus. Specifically, for each individual access unit of video and audio data, a PTS (Presentation Time Stamp) as reproduction/output time management information and, as required, a DTS (Decoding Time Stamp) as decoding time management information are described. In addition, a PCR (Program Clock Reference) and an SCR (System Clock Reference) are described as the reference values for these time management information. By referring to the PCR and SCR values, the reproducing apparatus causes the reference time intended on the encoder side to be reproduced by means of a synchronization signal called an STC (System Time Clock) inside the decoder, and controls, on the basis of the value of this STC and the PTS and DTS, the decoding and reproduction/output timings of the corresponding access unit.

As an example of conventional data transmission systems using a TS (Transport Stream) of the MPEG scheme as described above, there is a system including a multiplexer that calculates a PCR correction value on the basis of the arrival and expected output times of TS packets from a plurality of encoders based on a reference clock, thereby making it possible to correct the PCR without receiving a reference clock from the encoders (see, for example, Japanese Unexamined Patent Application Publication No. 9-321727 (paragraphs [0016] to [0030] and FIG. 1)).

DISCLOSURE OF INVENTION

In the case where the MPEG stream is received through broadcasting and recorded as it is in the TS format onto the recording medium as described above, when reading and reproducing the data, a deviation (jitter) occurs in the PCR described in the data, which makes it impossible to perform reproduction properly.

Since an MPEG stream provided through digital broadcasting is relatively free from fluctuations in the transmission timing of TS packets, PCR jitter is not likely to occur when decoding and reproducing the received MPEG stream in real time. On the other hand, an MPEG stream read from a recording medium is temporarily recorded into a buffer before being read to an MPEG decoder. At this time, since the read timing of data from the recording medium to the buffer is controlled in accordance with the free space available in the buffer, bursty data transmission is carried out. Accordingly, the transmission timing of the PCR in the MPEG stream transmitted from the buffer to the MPEG decoder does not coincide with the timing intended on the transmission side.

When PCR jitter in excess of the tolerance of PCR jitter for the MPEG decoder occurs, such phenomena as the freezing or blackout of the screen, and buzz and silence occur with respect to the video and audio, respectively, which makes it impossible to perform reproduction properly. Further, the same problem can also occur due to fluctuations in transmission timing in the case where image data is received via a transmission path such as the Internet.

The present invention has been made in view of the above-mentioned problems. Accordingly, it is an object of the present invention to provide an information reproducing apparatus in which, even when the transmission timing of a time reference value in the encoded stream deviates from the timing intended on the encoder side, the encoded stream can be properly decoded by the decoder for reproduction.

Further, it is another object of the present invention to provide a buffer control method for controlling the reading of a buffer that supplies data to a decoder so that even when the transmission timing of a time reference value in the encoded stream deviates from the timing intended on the encoder side, the encoded stream can be properly decoded by the decoder for reproduction.

Further, it is still another object of the present invention to provide a buffer control program for controlling the reading of a buffer that supplies data to a decoder so that even when the transmission timing of a time reference value in the encoded stream deviates from the timing intended on the encoder side, the encoded stream can be properly decoded by the decoder for reproduction.

In order to solve the above-mentioned problems, according to the present invention, there is provided an information reproducing apparatus which decodes and reproduces an encoded stream containing encoded data of a content, time management information used for reproduction of the encoded data, and a time reference value serving as a reference for the time management information, including: a buffer that temporarily stores packets constituting the encoded stream and sequentially supplies the packets to a decoder; leading data detecting means for detecting an input timing of leading data of an access unit of the content from the packets inputted to the buffer; data amount detecting means for detecting a data amount of the packets inputted to the buffer; and read control means for setting, as a reading speed of the packets from the buffer, an amount of data detected by the data amount detecting means during a period of time until an input timing of the leading data is detected a predetermined number of times by the leading data detecting means.

According to the information reproducing apparatus as described above, the period of time during which the leading data of the access unit inputted to the buffer is inputted a predetermined number of times becomes substantially constant, so the amount of data inputted to the buffer during this period substantially coincides with the packet transmission rate intended on the encoder side during that period. Accordingly, by controlling packets to be transmitted from the buffer to the decoder at this transmission rate by the read control means, the transmission timing of the time reference value can be made to approach the timing intended on the encoder side.

Further, according to the present invention, there is provided A buffer control method for controlling a read operation of a buffer when decoding and reproducing an encoded stream containing encoded data of a content, time management information used for reproduction of the encoded data, and a time reference value serving as a reference for the time management information, the buffer being configured to temporarily store packets constituting the encoded stream and sequentially supply the packets to a decoder, including: detecting by leading data detecting means an input timing of leading data of an access unit of the content from the packets inputted to the buffer; detecting by data amount detecting means a data amount of the packets inputted to the buffer; setting by read control means, as a reading speed of the packets from the buffer, an amount of data detected by the data amount detecting means during a period of time until an input timing of the leading data is detected a predetermined number of times by the leading data detecting means.

According to the buffer control method as described above, the period of time during which the leading data of the access unit inputted to the buffer is inputted a predetermined number of times becomes substantially constant, so the amount of data inputted to the buffer during this period substantially coincides with the packet transmission rate intended on the encoder side during that period. Accordingly, by controlling packets to be transmitted from the buffer to the decoder at this transmission rate by the read control means, the transmission timing of the time reference value can be made to approach the timing intended on the encoder side.

According to the present invention, even when a deviation occurs between the transmission timing of the time reference value in the encoded stream inputted to the buffer, and the timing intended on the encoder side, the amount of such a deviation can be suppressed at the time of output from the buffer, thereby making it possible to properly decode/reproduce the encoded stream by the decoder to enhance the quality of the outputted content irrespective of the characteristics of the decoder.

BEST MODE FOR CARRYING OUT THE INVENTION

An embodiment of the present invention as applied to an optical disk apparatus will be described below in detail with reference to the drawings.

Figure 1:
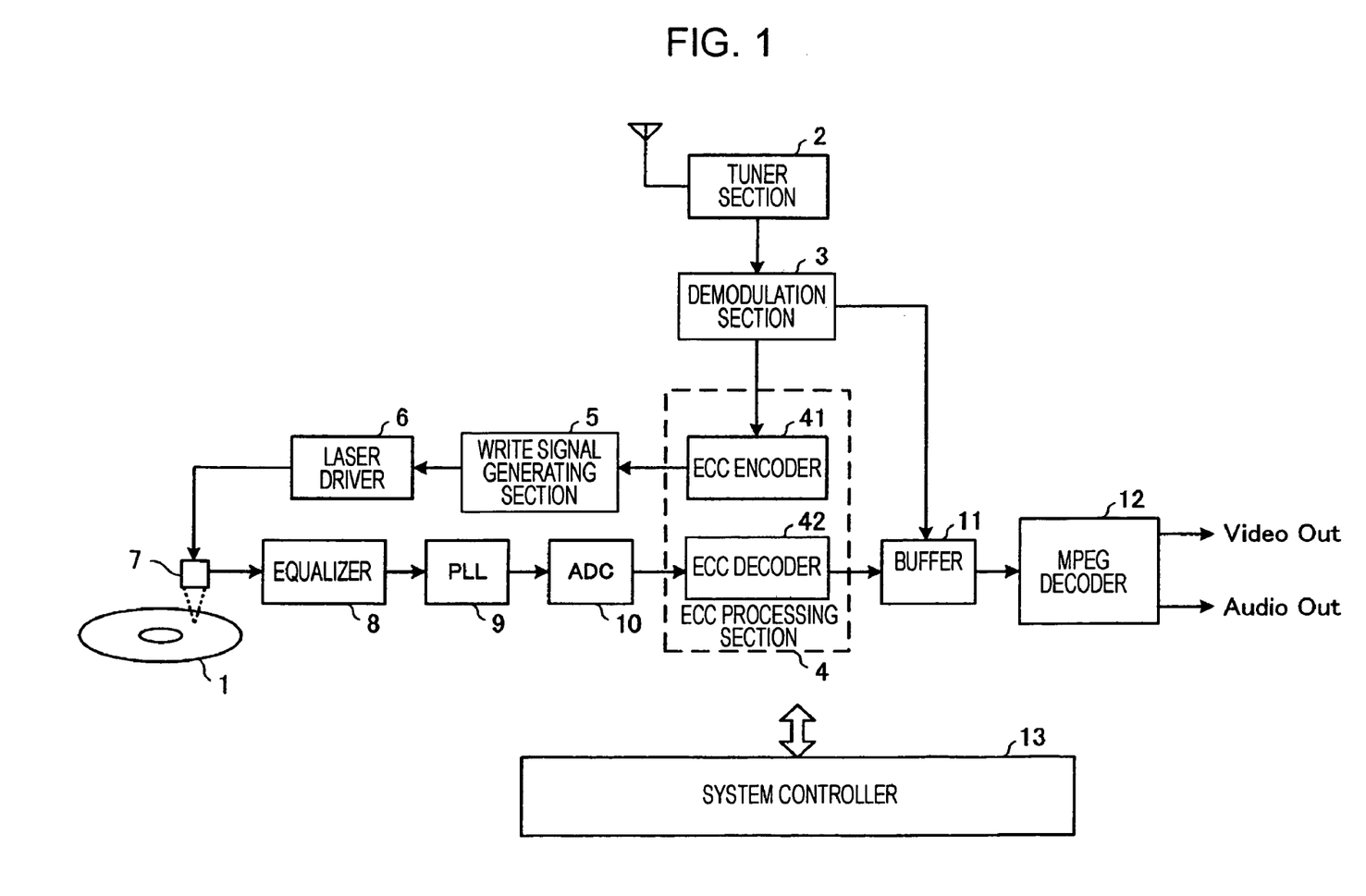
FIG. 1 is a diagram showing the schematic configuration of an optical disk apparatus according to an embodiment of the present invention.

FIG. 1 is a diagram illustrating the schematic configuration of the optical disk apparatus according to the embodiment.

FIG. 1 shows as an example the configuration of an optical disk apparatus that can receive a digital broadcast and record the digital broadcast onto an optical disk 1. This image recording/reproducing apparatus includes a tuner section 2, a demodulation section 3, an ECC (Error Correcting Code) processing section 4, a write-signal generating section 5, a laser driver 6, an optical pickup 7, an equalizer 8, a PLL (Phase Locked Loop) 9, an AD converter 10, a buffer 11, and an MPEG decoder 12. The ECC processing section 4 includes an ECC encoder 41 and an ECC decoder 42. Further, there is provided a system controller 13 that performs centralized control of the above-mentioned respective blocks. It should be noted that a rewritable Blu-ray Disc or the like, for example, is used as the optical disk 1.

In response to the input of a broadcast wave received by an external antenna, the tuner section 2 selects a signal of a predetermined carrier frequency in accordance with an instruction from the system controller 13, and outputs the selected reception signal to the demodulation section 3. The broadcast wave may be, for example, a terrestrial wave, or a satellite wave replayed by the BS or CS. Further, the broadcast signal may be received via a wire cable. The demodulation section 3 applies QPSK (Quadrature Phase Shift Keying) demodulation and error correction processing to the broadcast signal from the tuner section 2. Further, the demodulation section 3 separates necessary TS packets from the data stream on which the processing has been performed. When recording data onto the optical disk 1, the demodulation section 3 supplies the TS packets to the ECC encoder 41 of the ECC processing section 4, and when reproducing data, the demodulation section 3 supplies the TS packets to the buffer 11.

The ECC encoder 41 adds an error correction code to the data from the demodulation section 3, and further performs 8/16 modulation on the data. The write-signal generating section 5 outputs a control signal to the laser driver 6 in response to a signal from the ECC encoder 41. At this time, the signal output timing with respect to the laser driver 6 is controlled so as to be synchronized with the rotation control of the optical disk 1 by the system controller 13. In response to a control signal from the write-signal generating section 5, the laser driver 6 drives a recording laser diode of the optical pickup 7, thereby recording the MPEG stream received through broadcasting onto the optical disk 1.

On the other hand, a signal read from the optical disk 1 by the optical pickup 7 is supplied to the equalizer 8. The equalizer 8 corrects the frequency characteristics of the input signal to shape the signal waveform. The AD converter 10 converts the output signal from the PLL 9 into a digital signal. The ECC decoder 42 applies demodulation and error correction processing to the digital signal thus converted by the AD converter 10. Accordingly, TS packets containing video and audio are sequentially outputted from the ECC decoder 42 to the buffer 11.

TS packets stored in the buffer 11 are outputted to the MPEG decoder 12 through the control of the system controller 13. On the basis of reference time (STC) from the system controller 13, the MPEG decoder 12 decompresses and decodes the video data and audio data in the TS packets from the buffer 11. Accordingly, video and audio signals are reproduced from the MPEG stream read from the optical disk 1, and are outputted to the external via an interface circuit (not shown).

It should be noted that when the MPEG stream received through broadcasting is to be reproduced in real time, the TS packets from the demodulation section 3 are sequentially stored into the buffer 11, and in the same manner as described above, these TS packets are supplied to the MPEG decoder 12 for decompression and decoding processing.

In the optical disk apparatus according to this embodiment, in particular, the MPEG stream received through digital broadcasting can be recorded onto the optical disk 1 as it is in the TS format. Accordingly, recording can be performed without any alterations such as decoding and recoding with respect to the video data and audio data within the TS packets. It is thus possible to prevent degradation in image or sound quality and also simplify the apparatus configuration and processing system for effecting recording.

Next, description will be given of how the timing for performing decoding with the MPEG decoder 12 is controlled.

In the MPEG stream, a PTS as reproduction/output time management information is described for each individual access unit of video and audio data. As for the video data, a DTS as decoding time management information is additionally described as required. On the other hand, the system controller 13 outputs an STC of 27 MHz that serves as the reference time for each time management information mentioned above. When the time indicated by the STC and the time indicated by the DTS coincide with each other, the MPEG decoder 12 decodes the corresponding video, and when the time indicated by the STC and the time indicated by the PTS coincide with each other, the MPEG decoder 12 reproduces and outputs the corresponding video data or audio data.

Further, a PCR as a reference value for the PTS and DTS is described in the MPEG-2 TS packet. By correcting the STC by using the value of this PCR, in the MPEG decoder 12, decoding is executed at the timing intended on the encoder side.

Figure 2A:
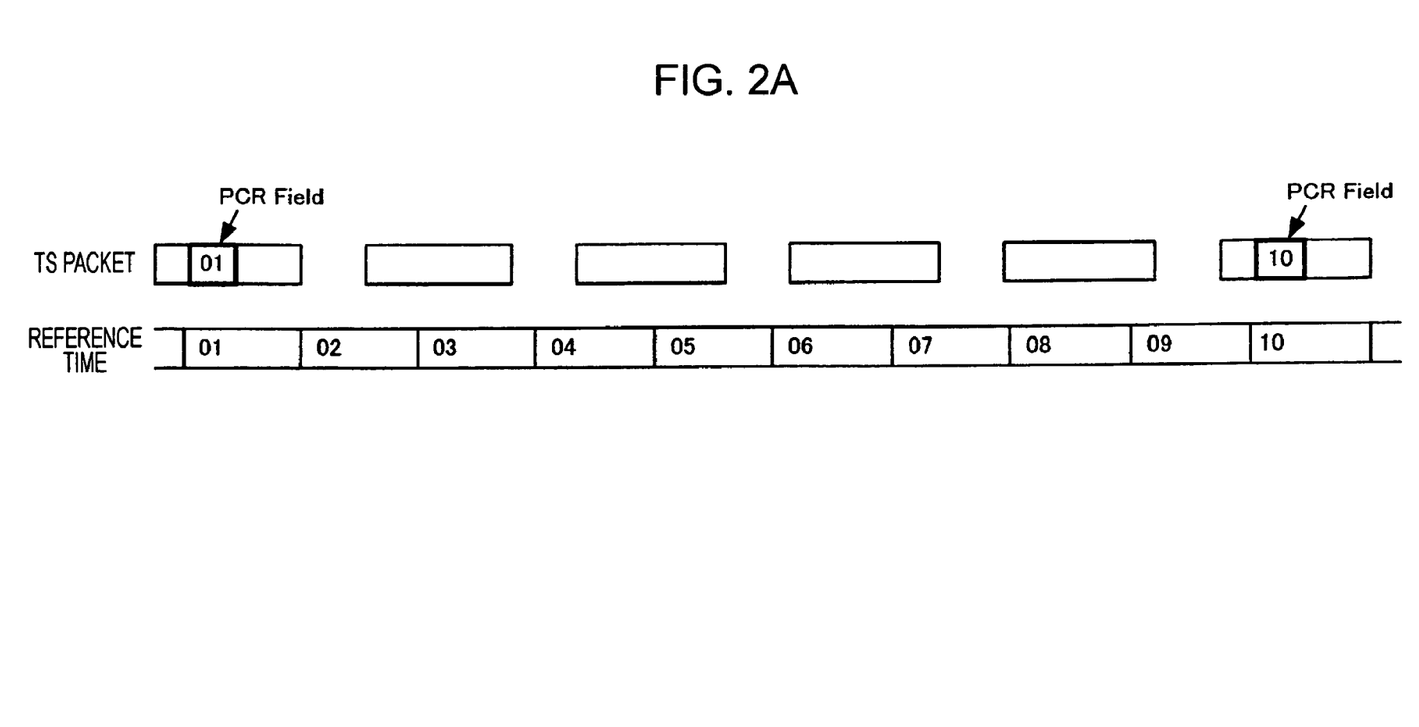
FIG. 2A is a diagram illustrating the correction of an STC using a PCR.
Figure 2B:
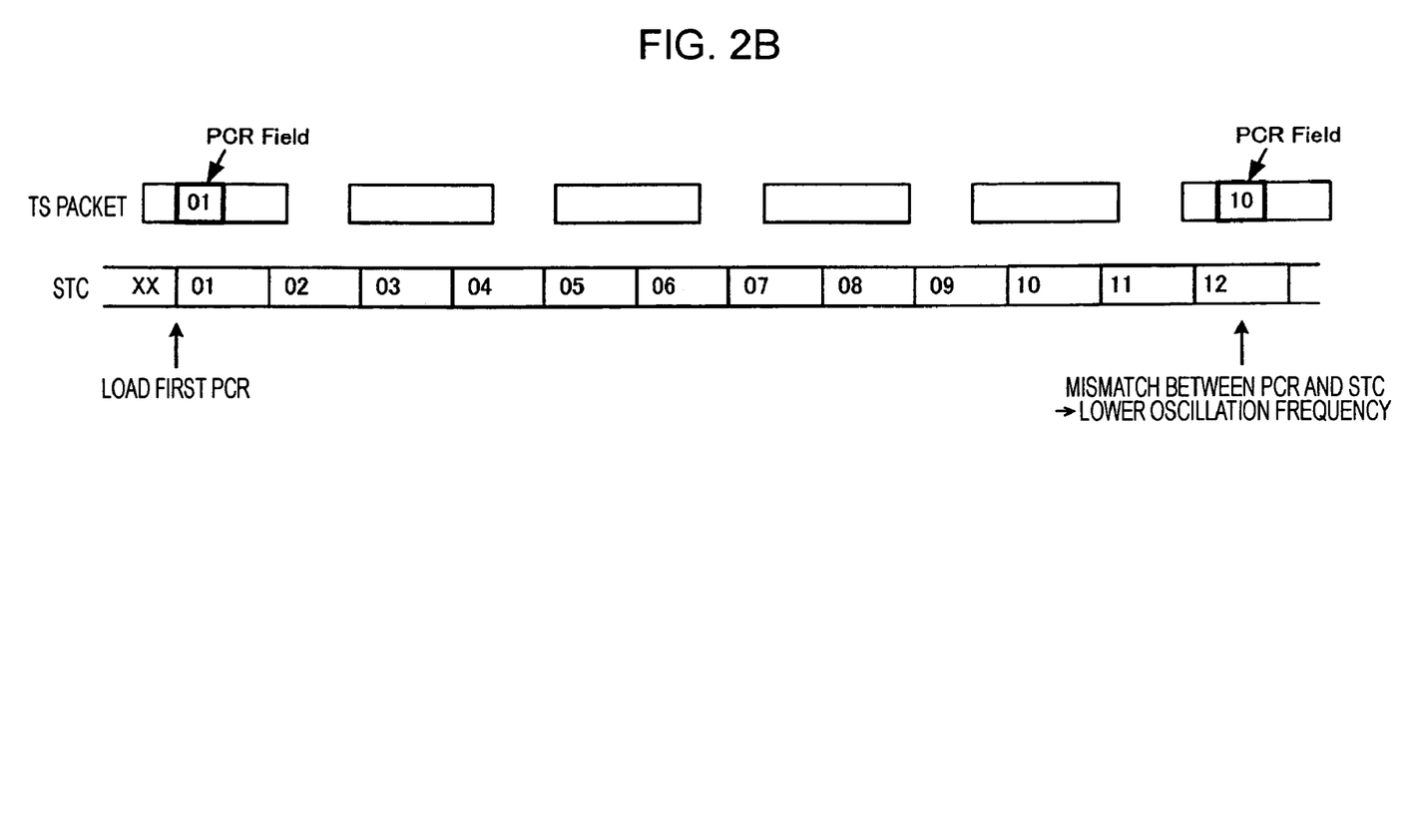
FIG. 2B is a diagram illustrating the correction of an STC using a PCR.

FIGS. 2A and 2B are diagrams illustrating the correction of the STC using the PCR.

FIGS. 2A and 2B assume a case where TS packets are transmitted through broadcasting.

As shown in FIG. 2A, the reference time synchronized with a video clock of 27 MHz is generated on the transmission side. The value of the reference time at the transmission timing of a TS packet is written into the storage field (47 bits) for the PCR provided in that TS packet.

On the other hand, a VCO (Variable Controller Oscillator) of 27 MHz is provided on the TS packet receiving side, and the STC is generated by a counter with this VCR as the clock. As shown in FIG. 2B, when the first PCR is received from the TS packet that has been received, the count value of the STC at that point is changed to the value of the PCR. Thereafter, PCRs are transmitted at an interval of 0.1 msec or less. When a PCR is received on the reception side, the count value of the STC and the value of the PCR at that point are compared against each other, and the oscillation frequency of the VCO is controlled on the basis of the difference between these values, thereby making it possible to perform decoding in the manner as intended on the transmission side. In the example shown in FIG. 2B, a TS packet with a PCR value of "10" is received when the STR is "12", so it is appreciated that the time at which the STC is generated is mode advanced. Accordingly, the oscillation frequency of the VCO is controlled so as to become lower. Conversely, if the PCR value is larger than the STC count value, the oscillation frequency of the VCO is controlled so as to become higher. Through such control, on the reception side, decoding is continued at the timing intended on the transmission side.

Incidentally, when TS packets being transmitted through a transmission path are subject to fluctuations, the above-mentioned control of the oscillation frequency of the VCO may not be performed properly.

Figure 3:
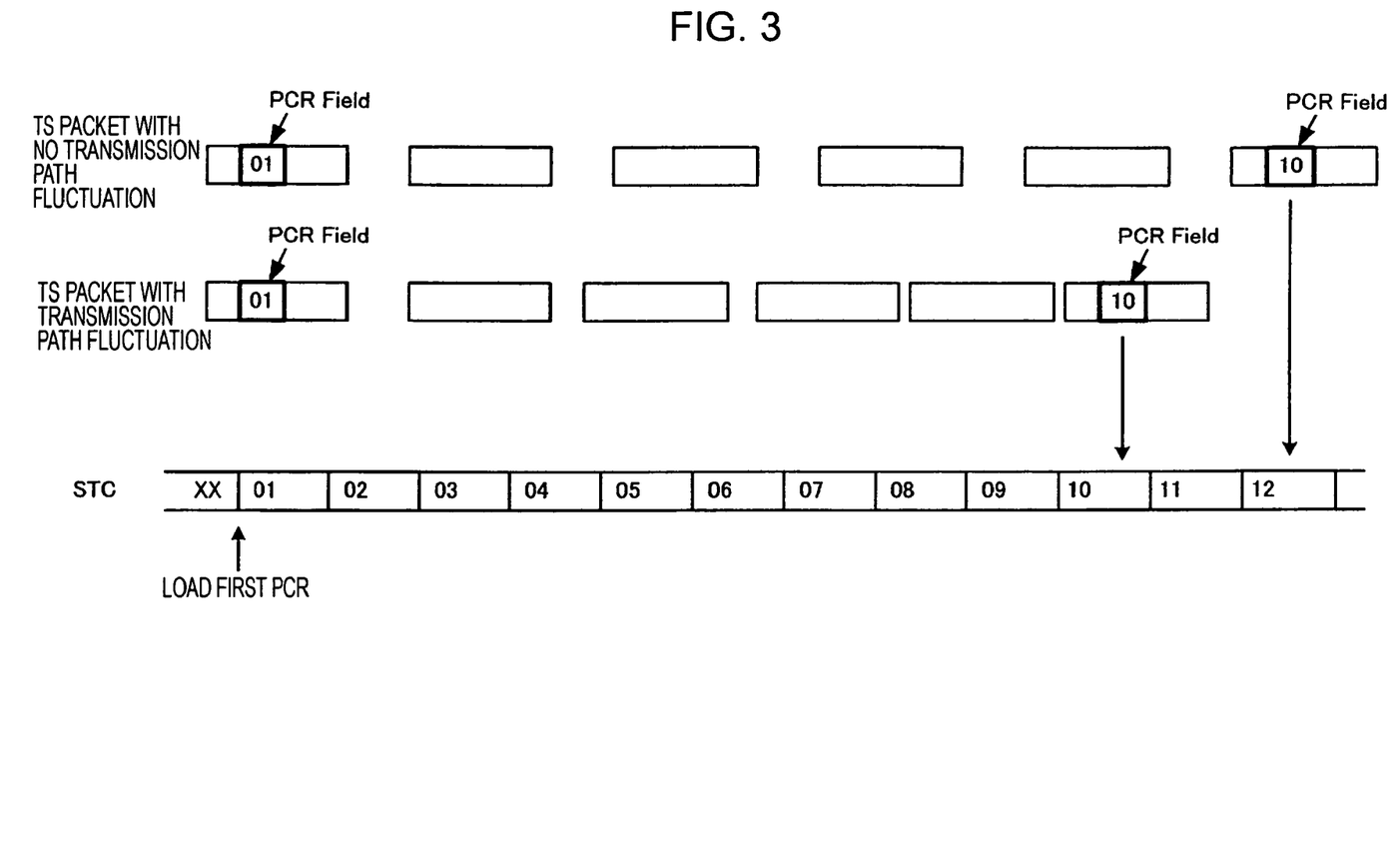
FIG. 3 is a diagram illustrating the reception timing of TS packets subject to transmission path fluctuations.

FIG. 3 is a diagram illustrating the TS packet receiving timing in the case where TS packets are subject to transmission path fluctuations.

When a TS packet is transmitted through digital broadcasting, since the transmission path is taken up by the MPEG stream, the TS packets are subject to hardly any transmission path fluctuation as they are transmitted. Accordingly, when TS packets received through digital broadcasting are to be reproduced in real time, the control of the oscillation frequency of the VCO is usually performed almost properly. In the example shown in FIG. 3, under an ideal reception condition with no transmission path fluctuation, the STC count value becomes "12" at the time when a TS packet with a PCR value of "10" is received.

However, in the event of transmission path fluctuations during the transmission of TS packets via the Internet, for example, the PCR reception timing becomes inaccurate. Such a deviation in PCR reception timing is referred to as PCR jitter. For example, consider a case where, as shown in FIG. 3, the reception timing of TS packets becomes earlier due to the influence of transmission path fluctuations, and hence a TS packet with a PCR value of "10" is received at the time when the STC count value is "10". In this case, although this corresponds to a situation where the oscillation frequency should be lowered, the output timing of the STC is judged to be correct on the transmission side.

Accordingly, when decoding is continued without changing the oscillation frequency of the VCO, the data decoding and reproduction/output timings become discontinuous, which makes it impossible to output video or audio continuously in a proper manner. The ISO/IEC (International Organization for Standardization/International Electrotechnical Commission) 13818-9 standard prescribes the PCR jitter tolerance to be ±50 μsec. Although it is possible to keep the PCR jitter within this tolerance in the reception of a digital broadcast, in the case of MPEG stream distribution via the Internet or the like, the PCR jitter can exceed this tolerance.

Figure 4:
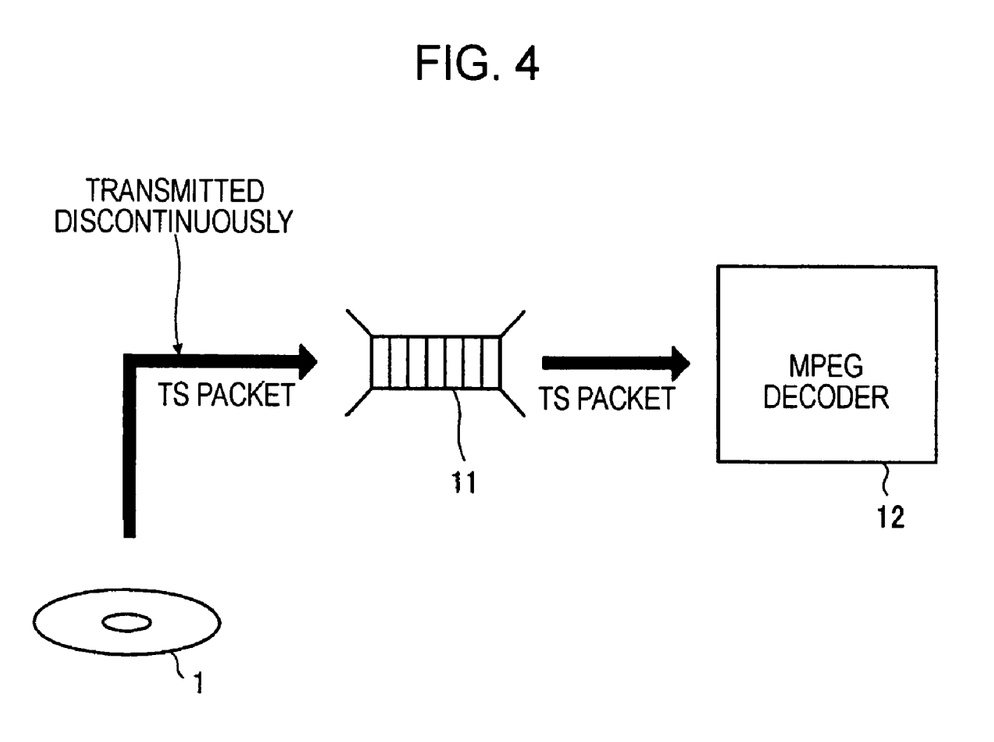
FIG. 4 is a diagram illustrating how data is transmitted when reading and decoding the MPEG stream recorded on a recording medium.

FIG. 4 is a diagram illustrating how data transmission is performed when reading and decoding an MPEG stream recorded on a recording medium.

In the optical disk apparatus according to this embodiment, an MPEG stream in the TS format received through digital broadcasting can be recorded onto the optical disk 1 as it is. However, when the MPEG stream is recorded onto the recording medium in this way, even though a TS packet is received at almost the same timing as intended on the transmission side, information on the reception timing is lost at the time when the MPEG stream is recorded onto the recording medium, so PCR jitter may occur.

Specifically, as shown in FIG. 4, TS packets of the MPEG stream read from the optical disk 1 are temporarily accumulated in the buffer 11 before being read by the MPEG decoder 12. Since the reading speed of data from the optical disk 1 is controlled in accordance with the amount of free space available in the buffer, TS packets are transmitted discontinuously with respect to the buffer 11. Accordingly, as in the case described above with reference to FIG. 3, fluctuations occur in the TS packet transmission path from the buffer 11 to the MPEG decoder 12, so the transmission timing of the PCR no longer coincides with the timing intended on the transmission side, resulting in PCR jitter. The amount of PCR jitter occurring in this case may sometimes far exceed the above-mentioned prescribed tolerance, ranging from several tens msec to several hundreds msec.

Such PCR jitter occurs when information on the arrival times of TS packets at the time of reception through digital broadcasting is lost as the MPEG stream is recorded onto the recording medium. Accordingly, for example, the occurrence of PCR jitter can be prevented by also recording information on the arrival times of respective TS packets at the time of reception onto the recording medium in advance, and using this information at the time of reproduction for the control of the transmission speed to the MPEG decoder 12. However, this method is not preferable from the viewpoint of the capacity of the recording medium and the complexity of the processing at the time of recording.

In contrast, the arrival times of TS packets can be estimated on the basis of the data rate at the time of transmitting the TS packets. That is, if the inverse of the data rate is read from the buffer 11 and set as the read cycle, it is possible to restore the transmission timing at the time of reception almost completely. Accordingly, in this embodiment, the data rate of TS packets within the recording medium is detected as appropriate at the time of reading, and the reading speed from the buffer 11 is controlled in accordance with the data rate thus detected, thereby suppressing the occurrence of PCR jitter.

Specifically, the data amount of TS packets read from the optical disk 1 is detected on a picture-by-picture basis. Since the progressive HDTV format prescribes a rate of 30 frames/second, the data rate can be determined by detecting the data amount of TS packets corresponding to one picture. In the video ES (Elementary Stream) in the MPEG stream, "0x00_00_01_00" as a picture start code (Picture_Start_Code) is described at the leading end of the picture, and the data amount from the detection of a picture start code to the next detection of a picture start code can be set as the data rate.

It should be noted, however, that since it is permitted to vary the encoding rate in the MPEG-2 scheme, if the data rate is reflected on a picture-by-picture basis, the reading speed from the buffer 11 may largely vary frequently. In actuality, the PCR jitter suppression effect can be attained even when the reading speed is adjusted on the basis of an average data rate over 1 second, for example. In this embodiment, as an example, the data amount of 30 frames, that is, one second, is detected as the data rate.

Figure 5:
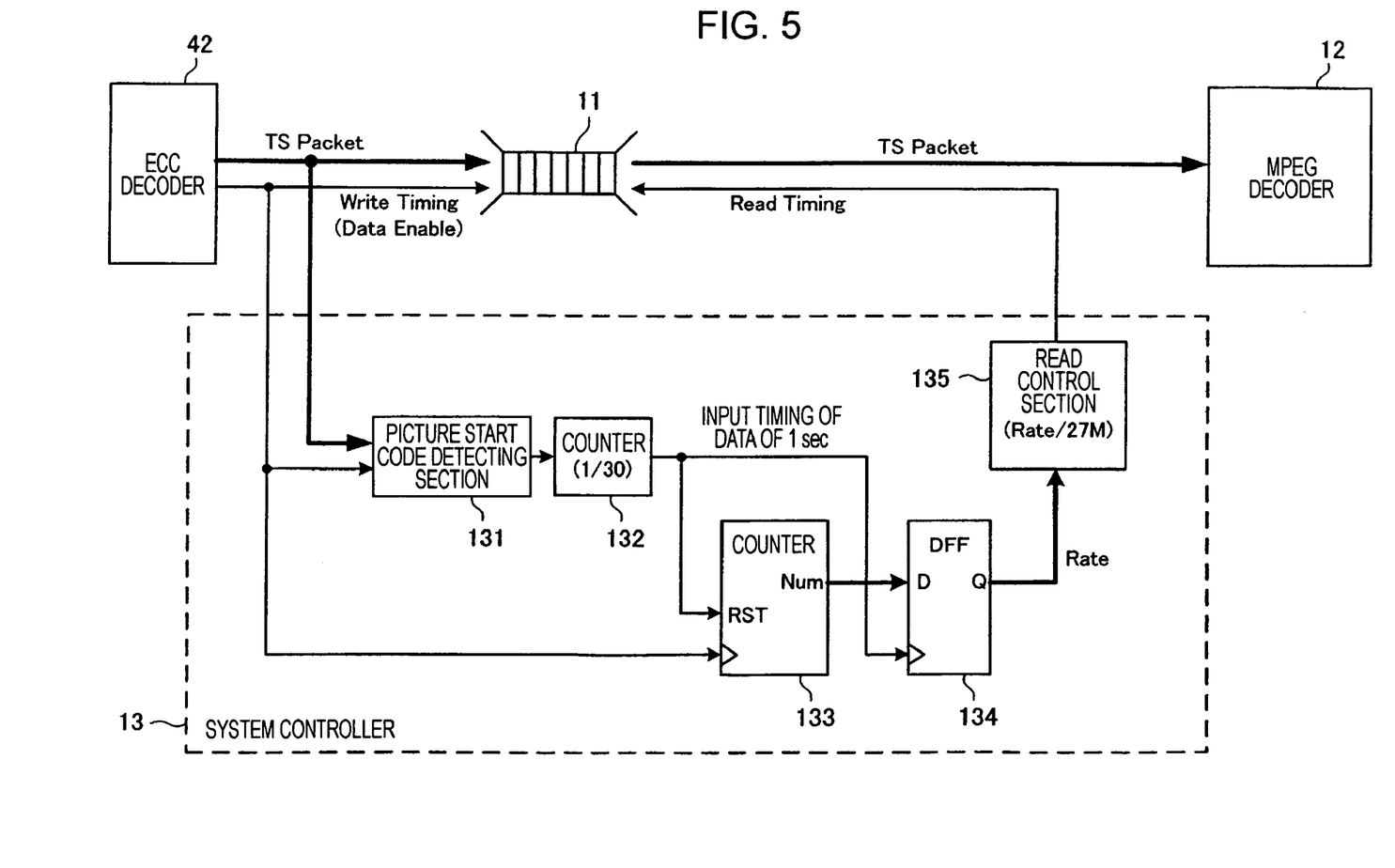
FIG. 5 is a diagram showing the functions for performing buffer reading control in the optical disk apparatus according to the embodiment.

FIG. 5 is a diagram showing the functions for reading the buffer 11 in the optical disk apparatus according to this embodiment.

As shown in FIG. 5, the optical disk apparatus according to this embodiment includes a picture start code detecting section 131, counters 132 and 133, a delay flip-flop (DFF) 134, and a read control section 135. These components are realized as the functions of the system controller 13, for example.

The picture start code detecting section 131 receives the input of TS packets read from the optical disk 1 and outputted from the ECC decoder 42 to the buffer 11. At the same time, the picture start code detecting section 131 receives from the ECC decoder 42 a data enable signal indicating the write timing of data with respect to the buffer 11. The picture start code detecting section 131 monitors the data of the inputted TS packets with the reception timing of the data enable signal as the clock, and outputs a detection signal upon detecting the picture start code.

The counter 132 counts the number of times a detection signal is outputted from the picture start code detecting section 131. The counter 132 outputs a timing signal when the count reaches 30, and also resets the count value. Accordingly, a timing signal is outputted from the counter 132 each time TS packets required for the reproduction of 1 second of video and audio are inputted to the buffer 11.

The counter 133 receives the data enable signal with respect to the buffer 11 as a clock, and counts the number of times this signal is inputted. Further, the counter 133 resets the count value at the output timing of the timing signal from the counter 132.

The DFF 134 latches the count value outputted from the counter 133 at the output timing of a control signal from the counter 132. Accordingly, the value latched by the DFF 134 is equal to the data amount of TS packets required for reproducing one second of video and audio inputted to the buffer 11 immediately before the latching. This data amount is defined as the data rate.

The read control section 135 adjusts the reading speed of data from the buffer 11 to the MPEG decoder 12 in conformity to the data rate outputted by the DFF 134. That is, the reading speed is raised when the inputted data rate has increased, and the reading speed is lowered when the data rate has decreased.

Figure 6:
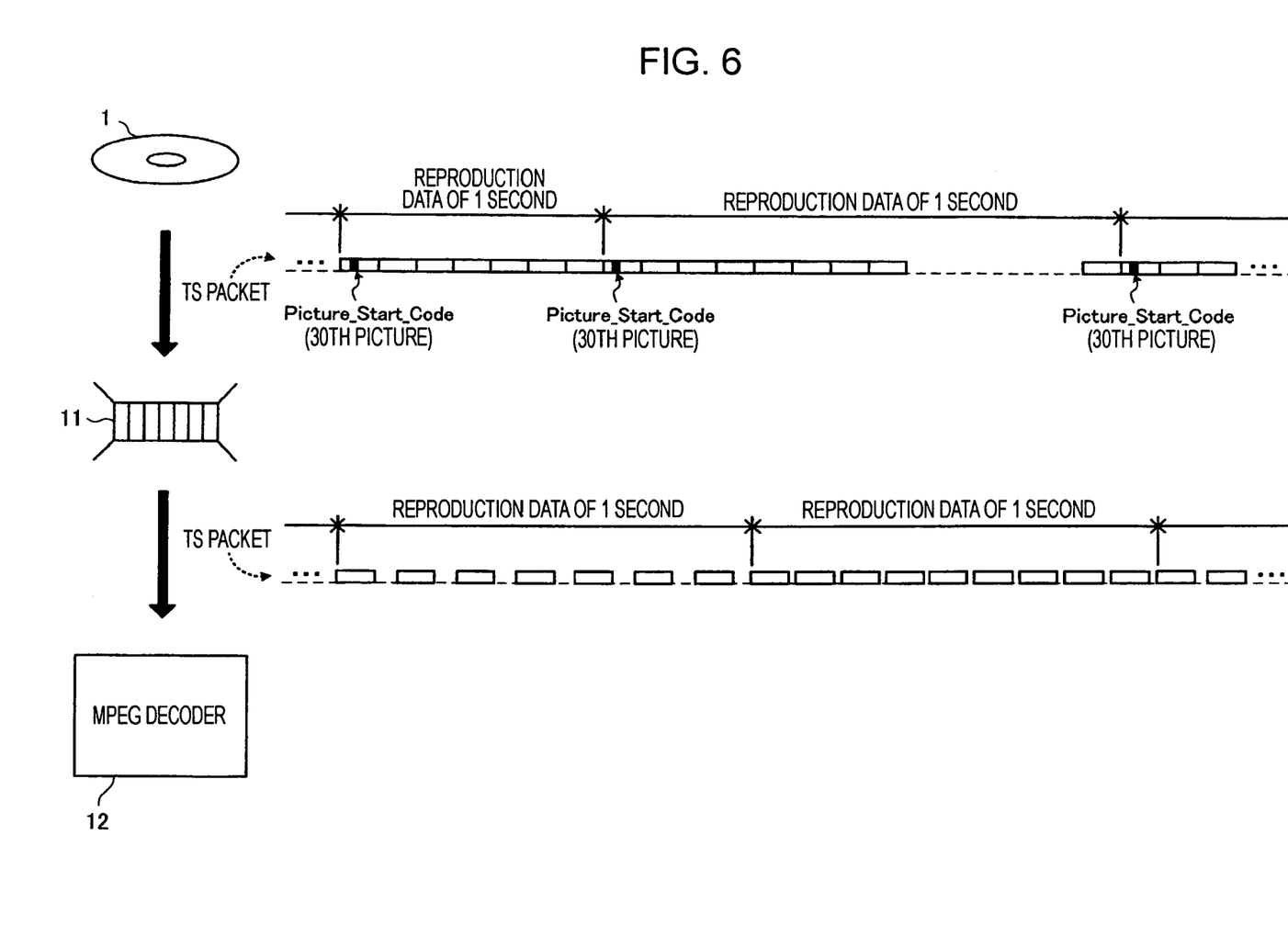
FIG. 6 is a diagram schematically illustrating the input/output timing of TS packets in the buffer.

FIG. 6 is a diagram schematically showing the input/output timing of TS packets in the buffer 11.

As shown in FIG. 6, TS packets are read from the optical disk 1 intermittently, so the interval at which the thirtieth picture code is detected by the counter 132 does not become constant. In other words, the read time of data required for reproducing one second of video and audio does not become constant.

In contrast, since the reading of TS packets from the buffer 11 is adjusted in accordance with the data rate, thus averaging out the interval at which the data for reproducing one second of video and audio is transmitted. Accordingly, the PCR transmission timing approaches the timing intended on the encoder side (which in this case is the transmission side of a digital broadcast), thereby suppressing the amount of PCR jitter. The MPEG decoder 12 can thus properly decode video and audio at all times for reproduction and output, thereby significantly reducing the probability of the occurrence of such symptoms as the freezing or blackout of the screen, and buzz or silence.

As described above, although the PCR jitter tolerance is standardized, tolerances in MPEG decoders that are actually on the market are not necessarily the same. For example, in some MPEG decoders, the screen may freeze when PCR jitter of 1 μsec occurs, whereas in other MPEG decoders, the screen functions properly even when PCR jitter of 100 μsec occurs. Further, since whether or not the screen functions properly also depends on the contents of the MPEG stream to be decoded, the proper functioning of a screen at the time of testing does not guarantee the proper functioning of that screen after it is put into the market. Therefore, it is desirable to suppress the amount of PCR jitter as reliably as possible. In this regard, by controlling the transmission timing of TS packets with respect to the MPEG decoder 12 as described above, it is possible to achieve enhanced stability of the quality of the reproduced video and audio irrespective of the type of the MPEG decoder used.

While in the above-mentioned embodiment the reception timing of the leading end of a picture is used to detect the data rate of TS packets, this should not be construed restrictively. The reception timing of the leading end of the access unit of video and audio data may be used as well. Accordingly, as for the encoded stream to be reproduced, other than one including respective data of video and audio, the present invention is also applicable to one including only audio data. Further, the stream encoding scheme is not limited to the MPEG scheme but other encoding schemes may also be used.

Further, while in the above-mentioned embodiment an optical disk is used as the recording medium for recording the encoded stream to be reproduced, other recording media such as an HDD or a memory card using a semiconductor memory may also be used. Further, the encoded stream to be recorded is not limited to one received through broadcasting but may also be one received via a network, for example. Alternatively, the present invention is also applicable to the reproduction of an encoded stream previously recorded onto a read-only optical disk or the like, for example, commercially available video contents such as a movie.

Further, other than an encoded stream recorded on a recording medium, the present invention is also applicable to the real-time decoding/reproduction of an encoded stream received via a transmission path in which the data being transmitted can be subject to fluctuations, such as the Internet.

The above-mentioned processing function can be realized by a computer. In that case, a program describing the processing contents of functions that should be included in an information reproducing apparatus is provided. By executing the program by a computer, the above-mentioned processing function is realized on the computer. The program describing the contents of processing can be recorded in advance onto a computer-readable recording medium. Examples of a computer-readable recording medium include a magnetic recording apparatus using a magnetic tape or a magnetic disc, an optical disk, a magneto-optical recording medium, and a semiconductor memory.

When distributing a program, for example, a portable recording medium such as an optical disk recording that program is offered for sale. Further, it is also possible to store a program in advance into the storage unit of a server computer, and transfer that program from the server computer to another computer via a network.

The computer executing a program stores, for example, a program recorded on a portable recording medium or a program transferred from a server computer, into the storage unit of its own. Then, the computer reads that program from the storage unit of its own, and executes processing according to the program. It should be noted that the computer may also read a program directly from the portable recording medium and execute processing according to that program. Further, the computer may also sequentially execute, each time a program is transferred from the server computer, processing according to the program that has been received.

The invention claimed is:

1. An information reproducing apparatus which decodes and reproduces an encoded stream containing encoded data of a content, time management information used for reproduction of the encoded data, and a time reference value serving as a reference for the time management information, comprising:
   a buffer that temporarily stores packets constituting the encoded stream and sequentially supplies the packets to a decoder;
   leading data detecting means for detecting an input timing of leading data of an access unit of the content from the packets inputted to the buffer by counting a number of times a picture start code is detected in the packets inputted to the buffer;
   data rate detecting means for detecting a data rate at which the packets are inputted to the buffer; and
   read control means for setting a reading speed of the packets from the buffer based on the data rate detected by the data rate detecting means during a predetermined period of time, in which the predetermined period of time corresponds to a time period in which an input timing of the leading data is detected a predetermined number of times based on the number of times the picture start code is detected by the leading data detecting means.

2. The information reproducing apparatus according to claim 1, wherein the read control means resets a reading speed of the packets from the buffer each time an input timing of the leading data is detected by the leading data detecting means.

3. The information reproducing apparatus according to claim 1, wherein when the encoded data contains a moving image as the content, the leading data detecting means detects an input timing of leading data of a picture from the packets.

4. The information reproducing apparatus according to claim 1, further comprising reading means for reading from a recording medium storing the encoded data,
   wherein the encoded stream read from the recording medium by the reading means is inputted to the buffer.

5. A buffer control method for controlling a read operation of a buffer when decoding and reproducing an encoded stream containing encoded data of a content, time management information used for reproduction of the encoded data, and a time reference value serving as a reference for the time management information, the buffer being configured to temporarily store packets constituting the encoded stream and sequentially supply the packets to a decoder, comprising:
   detecting by use of a leading data detecting section an input timing of leading data of an access unit of the content from the packets inputted to the buffer by counting a number of times a picture start code is detected in the packets inputted to the buffer;
   detecting by use of a data rate detecting section a data rate at which the packets are inputted to the buffer;
   setting by use of a read control section a reading speed of the packets from the buffer based on the data rate detected by the data rate detecting section during a predetermined period of time, in which the predetermined period of time corresponds to a time period in which an input timing of the leading data is detected a predetermined number of times based on the number of times the picture start code is detected by the leading data detecting section.

6. A non-transitory computer-readable recording medium having stored thereon a buffer control program for causing a computer to execute processing of controlling a read operation of a buffer when decoding and reproducing an encoded stream containing encoded data of a content, time management information used for reproduction of the encoded data, and a time reference value serving as a reference for the time management information, the buffer being configured to temporarily store packets constituting the encoded stream and sequentially supply the packets to a decoder, the buffer control program comprising:

detecting an input timing of leading data of an access unit of the content from the packets inputted to the buffer by counting a number of times a picture start code is detected in the packets inputted to the buffer;

detecting a data rate at which the packets are inputted to the buffer; and setting a reading speed of the packets from the buffer based on the data rate detected by the data detecting during a predetermined period of time, in which the predetermined period of time corresponds to a time period in which an input timing of the leading data is detected a predetermined number of times based on the number of times the picture start code is detected.

* * * * *